United States Patent [19]  
Carnahan

[11] 3,715,229  
[45] Feb. 6, 1973

[54] FISH CLEANING DEVICE  
[76] Inventor: George E. Carnahan, 1007 Regent Terrace, Kirkwood, Mo. 63122  
[22] Filed: May 1, 1972  
[21] Appl. No.: 249,363

[52] U.S. Cl. ............................ 17/66, 17/70, 17/44.3  
[51] Int. Cl. .............................................. A22c 25/00  
[58] Field of Search ............ 17/66, 17/70, 44.3, 69

[56] References Cited  
UNITED STATES PATENTS  
3,093,859  6/1963  Cooper .................................... 17/70  
2,945,256  7/1960  Harper .................................... 17/70

Primary Examiner—Robert Peshock  
Assistant Examiner—D. L. Weinhold  
Attorney—Cohn, Powell & Hind

[57] ABSTRACT

This fish cleaning device includes a pair of clamping plates hingedly attached at one end. A guillotine blade is provided at the remote end of one of the clamping plates which is adapted to make an incision in the fish head, and the clamping plates are spaced from each other at the hinge end to permit the fish to be received therethrough for accurate positioning during incision. The clamping plates are narrowed forwardly of the hinge and overlie the fish to provide guide margins for trimming the fish. Retaining prongs hold the fish in place between the clamping plates during the cutting and trimming operations.

6 Claims, 6 Drawing Figures

PATENTED FEB 6 1973 3,715,229

FISH CLEANING DEVICE

BACKGROUND OF THE INVENTION

This invention relates to a fish cleaning device and particularly to a device adapted to process small fish.

Small fish such as crappie, sunfish, perch, bluegill and the like are frequently excellent for eating purposes but, because of their size, which ranges from about 6 to 28 ounces, it is generally not practical to fillet them. Thus, because it is a tedious and slow process to clean small fish properly by removing the head, tail, fins and entrails these fish are frequently discarded.

Various devices are available to clamp fish in position while they are being cleaned and devices are also known which utilize a guillotine or similar blade means to remove fish heads and tails. However, these clamping and cutting devices tend to be bulky. They are primarily intended to process large fish and are unsuitable for small fish. Moreover, in general, they require the removal and repositioning of the fish during the various processing stages.

Devices are also available for removing fish bones in filleting processes, such devices providing in effect a template. However, known devices of this sort are not provided with a built-in cutting means and essentially they provide either a single overlying guide plate or a plurality of guide slots and usually utilize a special trimming tool. Further, known devices are not adapted to kill the fish, in a humane manner, immediately prior to processing.

SUMMARY OF THE INVENTION

This fish cleaning device is sufficiently compact to be carried easily in a tackle box, and is therefore particularly suitable for field use. The device provides a pair of clamping plates for holding the fish and is constructed in such a manner that accurate positioning of small fish relative to a built-in cutting blade is assumed. The blade makes an incision, immediately behind the head of the fish, so that it is killed instantly in a humane manner.

The rearward portion of the device in the vicinity of the hinge is open to receive the tail of the longer varieties of small fish and the device is therefore adapted to process a comprehensive range of sizes. The fish is held securely in place during the incision action and the removal of waste material such as the entrails and the dorsal fins can proceed without the necessity of removing the fish from the device.

The extreme simplicity of the device renders it inexpensive to manufacture and simple to operate and it can be used by almost anyone without previous training to prepare edible fillets, particularly suitable for pan frying, easily and speedily.

The device includes a pair of elongate clamping plates hingedly attached at the rear end. One of the clamping plates includes a depending blade means at the front end having a cutting edge which extends in a generally longitudinal direction and is adapted to make an incision in the fish in the vicinity of the head. The other clamping plate includes an abutment portion engageable by said blade means so that the blade provides a spacer between said plates. The hinge means between the clamping plates includes side portions, transversely disposed of said plates and spaced from each other to define an opening adapted to receive the fish and thereby permit accurate positioning of the head relative to the blade. Retaining means between the clamping plates holds the fish in place between said plates during incision. The cutting edge of the blade means includes opposed ends, one of said ends being spaced from the abutment portion when the other of said ends engages the abutment portion so that the cutting edge is inclined. The cutting edge is angularly related to the general longitudinal axis of the clamping plates, which is substantially perpendicular to the hinge axis.

The clamping plates include relatively narrow portions forwardly disposed of the hinge means and defining associated, aligned guide margins which are engageable by a knife edge to trim the fish. The clamping plates extend rearwardly of the hinge means and include associated transverse clamping portions adapted to engage the tail of the fish for de-scaling.

Each of the clamping plates includes a finger locating hole to ensure that the hand holding the device is clear of the blade means during processing.

DESCRIPTION OF THE PREFERRED EMBODIMENT

Figure 1:
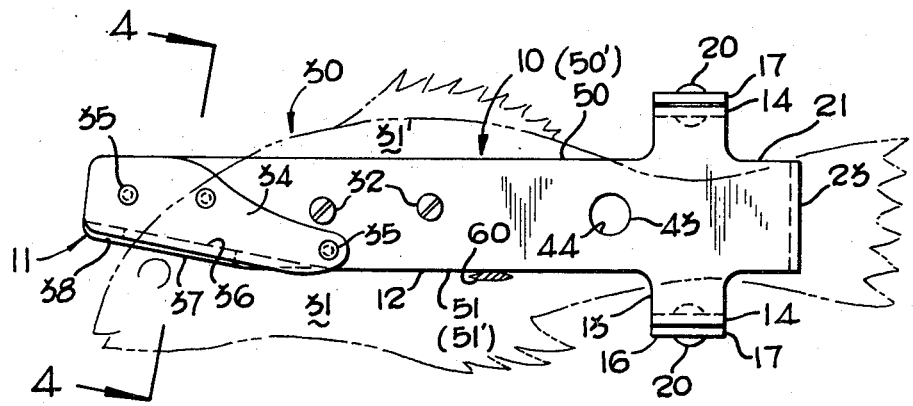
FIG. 1 is a plan view of the device with the fish in an operative position for trimming.
Figure 2:
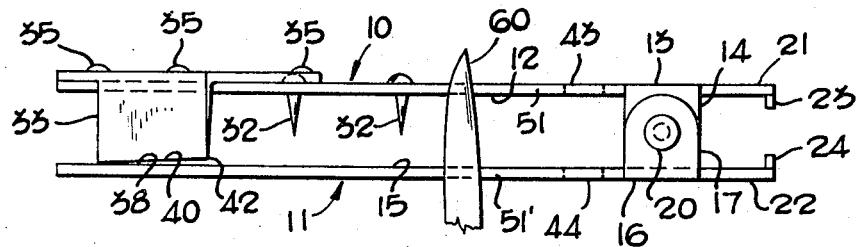
FIG. 2 is a side elevational view of the device.
Figure 3:
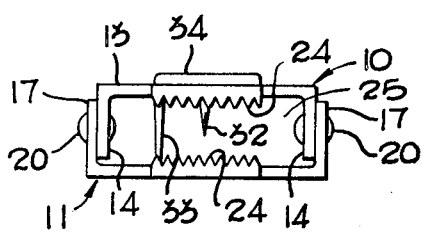
FIG. 3 is an end elevational view of the device.
Figure 4:
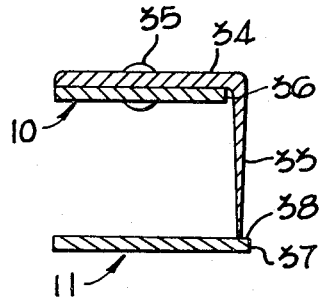
FIG. 4 is an enlarged cross section taken on line 4—4 of FIG. 1.

Referring now by characters of reference to the drawing and first to FIGS. 1 and 2 it will be understood that the device includes a pair of hingedly attached clamping plates 10 and 11. The upper plate 10, which constitutes a first clamping element, includes a narrow portion 12 and a relatively wide portion 13 at the hinge end. A pair of opposed lugs 14 are integrally formed with said upper plate 10. The lower plate 11, which constitutes a second clamping element includes a narrow portion 15, generally in register with the associated narrow portion 12 of the upper plate 10, and a relatively wide portion 16. A pair of opposed lugs 17 are integrally formed with the lower plate 11 and are outwardly disposed of the lugs 14 of the upper plate 10. Associated lugs 14 and 17 constitute hinge side portions and are apertured to receive aligned hinge pins 20, said lugs and pins constituting hinge means. The clamping plates 10 and 11 each include rearwardly extending portions 21 and 22 respectively, which are provided with serrated jaws 23 and 24 constituting transverse clamping portions. The clamping plates are spaced from each other in the vicinity of the hinge means to provide an opening generally indicated by numeral 25 in FIG. 3 and defined by the clamping plates and the lugs 14 and 17. The opening 25 permits the tail of the fish, generally indicated by numeral 30, to be received therethrough if necessary. The upper plate 10 includes a pair of prongs 32 adapted to operatively pierce the fish 30 and constituting a retaining means holding the fish in place during processing. The pins 32 are attached securely to the upper plate 10 and are spaced from the inner face of the lower plate 11.

At its remote end the clamping plate 10 includes a depending blade 33, constituting a blade means, and having a transverse portion 34 attached to the upper plate 11 as by rivets 35 so that the blade is essentially integral with said upper plate 10. The longitudinal axis of the clamping plates is generally perpendicular to the hinge axis but the narrow portion 12 of the upper plate 10 includes an inclined edge 36 to permit the blade 33 to be attached to said plate 10 in angled relation to said longitudinal axis. The blade 33 is engageable with the lower plate 11 and for this reason the narrow portion 15 of the lower plate 11 includes an inclined edge 37 outwardly disposed of the inclined edge 36 of the upper plate 10 to define an abutment portion, engageable by the cutting edge 40 of the blade 33. As shown clearly in FIG. 2 the cutting edge 40 includes a forward end 41 and a rearward end 42 which is spaced from the abutment portion 38 when the forward end 41 is engaged therewith.

The upper plate 10 and the lower plate 11 each include an aperture indicated by numerals 43 and 44 respectively, to provide finger or thumb guides positioning the fingers of the hand grasping the device while the other hand operates the device, to preclude the possibility of injury during operation.

The upper plate 10, as shown in FIG. 1, includes opposed sides providing guide margins 50 and 51. The lower plate 11 includes opposed sides providing guide margins 50' and 51' substantially in register with associated margins 50 and 51 of the upper plate 10. The guide margins are disposed between the hinge and the blade 33 and are engageable by the edge of a fish knife, generally indicated by numeral 60, to guide the knife edge and facilitate the trimming of the fish 30.

Figure 6:
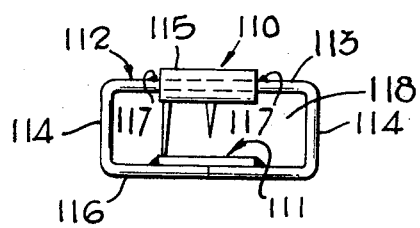
FIG. 6 is an end view of the modified device.
Figure 5:
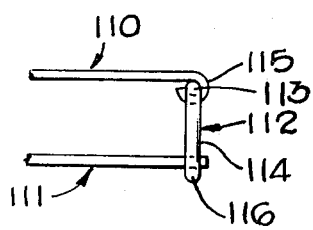
FIG. 5 is a fragmentary view of a modified version of the device.

Referring now to the modified hinge construction disclosed in FIGS. 5 and 6 it will be understood that forward parts not shown are substantially identical with those of the first embodiment. As shown, the upper plate 110 and the lower plate 111, which are of substantially constant width corresponding to the narrow portions of the clamping plates of the species already described, are held apart by a hinge construction which includes a loop 112. The loop 112, in effect, corresponds to the wide portion of the first species and includes an upper hinge pin portion 113 and a lower portion 116, interconnected by spaced side portions 114. The upper plate 110 is formed into a compatible hinge portion 115, wrapped around said upper hinge pin portion 113, and the lower plate 111 is secured to the lower portion 113 as by welding. The upper hinge pin portion 113 may be deformed slightly, or provided with spot welds 117 disposed adjacent the ends of the upper plate hinge portion 115 to preclude movement of said upper plate along said hinge pin portion. It will be understood that the fish tail can be received through the open interior 118 of the loop 112 so that the fish can be accurately positioned relative to the blade 33, as described above with respect to the first species.

It is thought that the structural features and functional advantages of the preferred embodiments of this fish cleaning device have become fully apparent from the foregoing description of parts but for completeness of disclosure the use of the device will be briefly described.

With the clamping plates 10 and 11 held in the hingedly open position the fish 30 is placed between said plates and positioned approximately as shown in FIG. 1. Preferably the thumb and middle finger of the hand holding the device are located by the apertures 43 and 44 to ensure that this hand is free of the blade 33. The plates 10 and 11 are then urged toward each other so that the prongs 32 pierce the fish 30 holding it securely in place so that the cutting edge 40 of the blade 33 can cut through the skin and the boney structure of the spine killing the fish instantly if it is still alive. The forward end 41 of the blade 33, engages the abutment 38 when the clamping plates are closed together thereby providing a spacer between said plates. The whole of the cutting edge 40 does not engage the abutment 38 and thus the blade is not dulled. In practice the forward end 41 is about a quarter of an inch beyond the edge of the fish and the rearward end is spaced about one thirty-second part of an inch from the lower plate 11. Because the device is open at the rearward, hinged end to receive the tail, the fish 30 can be positioned with reasonable accuracy relative to the blade.

With the fish 30 secured by the prongs 32 and the blade incision made the fish is ready for further processing consisting of the trimming of various parts.

This processing requires the use of a sharp fish knife 60 and a pair of nippers (not shown). With the clamping plates 10 and 11 held together the device is turned on its side so that the belly of the fish 30 is facing upwardly. The trimming operation is commenced close to the hinge end of the guide margins 51 and 51' at the blade side of the device. The cutting edge of the knife 60 is disposed in engaging relation across both of said margins 50 and 50' and said knife is drawn toward the operator so that the bottom portion 31 of the fish 30, consisting of the protruding anal fin, belly and entrails, pectoral fins, and head is removed in one pass of the knife together with the lower end of the rib bones, it being understood that the margins 51 and 51' extend substantially to the blade 33 and therefore to the incision already made.

The device is now returned to the position shown in FIG. 1 and using guide margins 50 and 50' in turn as a guide for the cutting edge of the fish knife 60 the skin of the top portion 31' of the fish 30, along each side of the dorsal fins, is slit at the base of said fins. Nipper pliers may be used to pull away the dorsal fins and discard them.

If its is now desired to skin the fish, the clamping plates 10 and 11 are held apart and the fish urged rearwardly so that, if it does not already do so, the fish tail projects beyond the serrated jaws 23 and 24. By now moving the narrow portions of the plates 10 and 11 into the open position the tail is securely clamped and may be cut off by using the knife. Following this operation the fish 30 may be removed from the device so that the skin can be pulled away with nipper pliers by pulling from the head end toward the tail. Alternatively, if the fish 30 is to be scaled, it is removed from the device and reversely positioned to clamp the tail between the serrated jaws 23 and 24 with the head pointing away from the device. The tail is cut off, following the scaling operation, while the fish is clamped in this position.

I claim as my invention:

1. A fish cleaning device comprising:
   a. a first elongate clamping element including opposed longitudinally extending sides, b. a second elongate clamping element including opposed, longitudinally extending sides, c. hinge means interconnecting the clamping elements and including a transverse hinge axis, d. blade means depending from one side of one of said clamping elements in spaced relation from said hinge means, and adapted to incise the head of a fish clamped between said clamping elements, and e. at least one of said clamping elements including a guide margin between said blade means and said hinge means, said guide margin being engageable by a knife edge to trim a portion of the fish.

2. A fish cleaning device as defined in claim 1, in which:

f. the clamping elements each include a guide margin disposed on the same side as said blade means and extending substantially to said blade means.

3. A fish cleaning device as defined in claim 2, in which:

g. the clamping elements are spaced from each other transversely of the hinge axis to provide an opening adapted to receive the fish.

4. A fish cleaning device as defined in claim 1, in which:

f. each clamping plate includes a clamping face, g. the blade means depends from said first clamping element and includes forward and rearward ends defining an inclined cutting edge, h. the second clamping element includes an abutment portion engageable by said forward end when said rearward end is spaced from said second clamping element, and i. one of said clamping elements includes a depending prong operatively spaced from the clamping face of the other of said clamping elements when the blade means engages the abutment means.

5. A fish cleaning device comprising:

a. a first elongate clamping element including opposed sides, and depending blade means at one end, b. a second elongate clamping plate including opposed sides and abutment means at one end engageable by said blade means, c. hinge means between the clamping elements having a transverse hinge axis disposed in longitudinally spaced relation from the blade means and including opposed side portions spaced from each other to define an opening adapted to receive the fish, and d. one side of each clamping element including a guide margin disposed between the blade means and the hinge means, and substantially in register with the guide margin of the other clamping element said guide margins being engageable by a knife edge to trim a portion of the fish, side associated guide margins being disposed inwardly of the side portions of the hinge means.

6. A fish cleaning device as defined in claim 5, in which:

e. the other side of each clamping element includes a guide margin engageable by a knife edge to trim an opposite portion of the fish, f. the clamping elements extend rearwardly of the hinge means and include associated, oppositely disposed transverse clamping portions adapted to engage the tail of the fish.

* * * * *